Aug. 22, 1967     I. S. HOFFMAN ETAL     3,337,004
IMPACT ENERGY ABSORBER

Filed Dec. 22, 1964     2 Sheets-Sheet 1

INVENTORS
IRA S. HOFFMAN
THOMAS VRANAS

ATTORNEYS

Aug. 22, 1967   I. S. HOFFMAN ETAL   3,337,004
IMPACT ENERGY ABSORBER
Filed Dec. 22, 1964   2 Sheets-Sheet 2
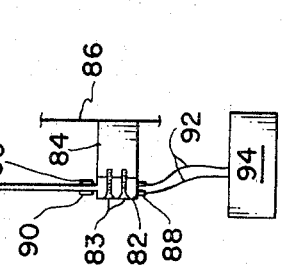
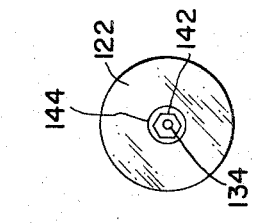
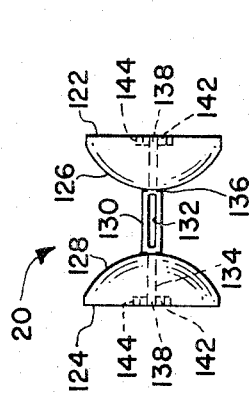
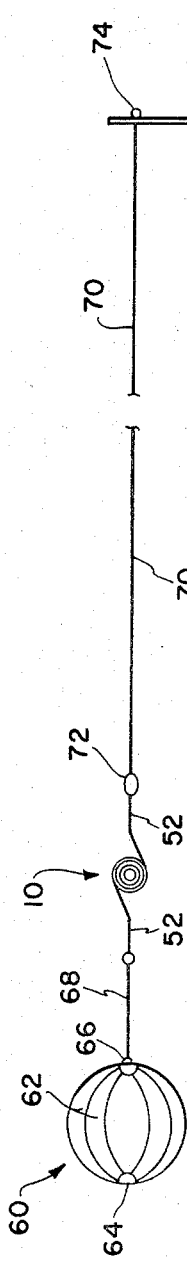
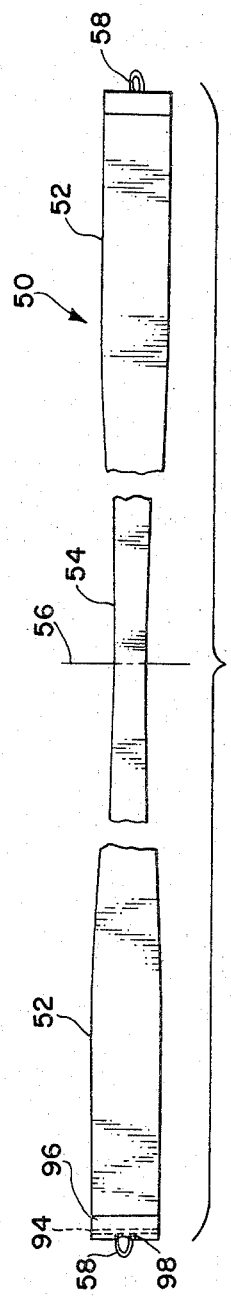
INVENTORS
IRA S. HOFFMAN
THOMAS VRANAS
ATTORNEYS

United States Patent Office 3,337,004
Patented Aug. 22, 1967

3,337,004
IMPACT ENERGY ABSORBER
Ira S. Hoffman, Newport News, and Thomas Vranas, Hampton, Va., assignors to the United States of America as represented by the Administrator of the National Aeronautics and Space Administration
Filed Dec. 22, 1964, Ser. No. 420,466
16 Claims. (Cl. 188—1)

ABSTRACT OF THE DISCLOSURE

An impact energy absorber for a color visibility and drag measuring system having an energy absorber adjacent a drag member with one end secured thereto and the other end secured to a cable. The end of the cable is attached to a cantilever beam to which are applied strain measuring devices. The energy absorber includes a tape gradually widening from the center toward the ends thereof and made from a material tending to yield and retain its rolled shape. The tape is folded upon itself about its centerline and, starting from the narrow portion, is wound about the shaft of a reel which has the inner faces on the end plates thereof spaced to provide sufficient clearance for the tape to be unwound uniformly. Energy is absorbed at a decreasing rate by the unrolling of the tape, as well as the rotation of the reel.

---

The invention described herein may be manufactured and used by or for the Government of the United States of America for governmental purposes without the payment of any royalties thereon or therefor.

This invention relates generally to energy absorption and more particularly to an impact energy absorber having a decreasing absorption rate.

As space exploration continues, many studies, experiments, and tests must be conducted to provide information as to the operability of devices in the vacuum of outer space. For example, it is necessary to obtain data regarding the effects of the space environment upon bodies moving therethrough. If these traveling bodies are to be manned and controlled by a human pilot, the visual ability of that person becomes an essential factor. The instant invention involves a single system device that permits obtaining both characteristics of movement through space and visual characteristics of bodies near the traveling vehicle. That is, a member may be deployed that is of a color to determine visual characteristics as well as providing data relating to the air density by measuring the drag of that member as it moves or is drawn through orbit at high altitudes. However, if a member is deployed from a moving vehicle, when that member reaches the end of the cable attaching it to the vehicle, there is a sudden impact which, depending upon the circumstances, would cause the member to reverse direction and overtake the vehicle from which it was deployed. In order to prevent this bounce effect, some device must be provided to either slow down the deployed member or to absorb the energy created by the drag forces. Such a device must be miniaturized and yet withstand maximum vibrational effects to operate in a space environment as well as covering a wide range of impact energy magnitudes while not being affected by several weeks of dormancy prior to use. It must also possess the feature of diminishing absorption rate versus time during absorber operation. It is readily apparent that the spring balances and recoil springs, for example those used in counterbalances for windows and maintaining light fixtures at a predetermined position, are incapable of meeting the requirements enumerated hereinabove. Such devices are cumbersome, susceptible to damage from periods of dormancy and the intensive vibrations during launch, as well as being limited in range and requiring gravitational effects. Further, known devices are unable to absorb deployment forces while permitting maintenance of an inelastic connection after complete deployment.

The present invention has all of the required features which are provided by utilizing a tape that narrows from each end toward the center where it is folded and starting at the center of the tape is wrapped about a reel.

It is an object of this invention to provide an energy absorber for minimizing impact forces.

Another object of this invention is to provide an impact energy absorber for application where moving masses are suddenly stopped by arresting cables or ropes.

A further object of this invention is to provide a reel and tape energy absorption device having a decreasing rate of absorption.

A still further object of this invention is to provide a color visibility study system utilizing an energy absorber for absorption of impact energy upon deployment of the system.

Still another object of the instant invention is to provide a drag measuring system for use in a low vacuum environment and which utilizes a novel impact energy absorber.

A further object of this invention is to provide a method of forming an energy absorber.

Another object of the instant invention is to provide a method for visual color study and drag measurement in a low vacuum environment.

Generally, the foregoing and other objects are accomplished by locating an energy absorber adjacent a drag member and having one end secured thereto and the other end secured to a cable. The other end of the cable is attached to a cantilever beam to which are applied strain measuring devices. The impact energy absorber includes a tape which gradually widens from the center toward the ends thereof and which is folded upon itself about its centerline. Starting with the narrow portion, the tape is wound about the shaft of a reel which has the inner faces on the end plates thereof spaced to provide sufficient clearance for the tape to be unwound. Energy is absorbed at a decreasing rate by the unrolling of the tape as well as the rotation of the reel.

A more complete appreciation of the invention and many of the attendant advantages thereof will be readily apparent as the same becomes better understood by reference to the following description when considered in connection with the accompanying drawings, wherein:

FIG. 5 is a front view of an alternative embodiment of the reel of the instant absorber;

FIG. 6 is an end view of FIG. 5;

FIG. 7 is a plan view of the tape with portions omitted for clarity; and

FIG. 8 is a diagrammatic view of the visual study and drag measuring system in which the instant invention is utilized.

Figure 1:
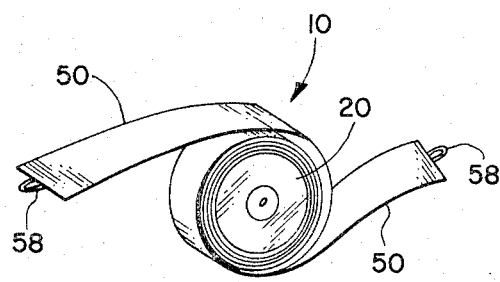
FIG. 1 is an isometric of the energy absorber of the present invention.

Referring now to the drawing wherein like reference numerals designate identical or corresponding parts throughout the several views and more particularly to FIG. 1 wherein an energy absorber, generally designated by reference numeral 10, is shown as having reel 20 and tape 50. Reel or spool 20 is comprised of elongated shaft 30 and disk-shaped end plates 22 and 24 and inner plates 26 and 28. The opposite ends of shaft 30 are reduced in diameter at 34 to form stop or abutment 36 which prevents end plates 22 and 24 and disk-shaped inner plates 26 and 28 from moving inwardly. Sections 34, of reduced diameter, on shaft 30 are threaded at 38. The outer faces of end plates 22 and 24 are provided with counterbores or rabbets 44 surrounding a central bore 40 for receiving nut 42 which is threaded upon reduced diameter sections 34 of shaft 30.

Figure 3:
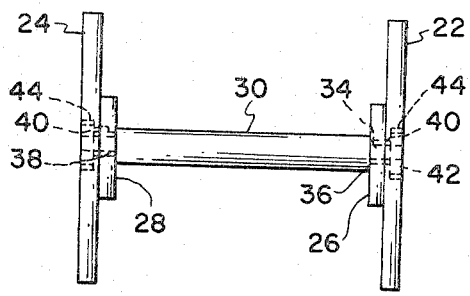
FIG. 3 is a front view of a reel of one of the embodiments of the absorber of the instant invention.
Figure 4:
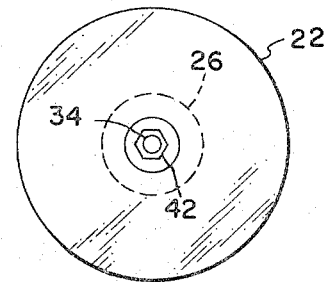
FIG. 4 is an end view of FIG. 3.

The alternative embodiment of spool 20, FIGS. 5 and 6, is similar to that shown in FIGS. 3 and 4. However, shaft 130 has an elongated radial slot 132 centrally located between end plates 122 and 124 that receives a small portion of the narrow section of tape 50. End plates 122 and 124 have convex hemispherical inner faces 126 and 128, respectively, prevented from moving inwardly by abutment 136 formed by reduced diameter end sections 134 of shaft 130. End sections 134 have threads 138 for receiving nuts 142 in counterbores 144 extending about central bore 140 in end plates 122 and 124. Although the precise degree of absorption ability is difficult, if not impossible, to compute, convex inner faces 126 and 128 retain tape 50 in a neatly wound package which may be more desirable under certain conditions.

As more clearly shown in FIG. 7, tape 50 has wide end portions 52 and gradually decreases in width to narrow central portion 54 at centerline 56. Wide end portions 52 are provided with attachment members 58 for attaching the opposite ends of tape 50 to cables or similar energy transmitting elements. It has been found that an operable and expediently formed attachment member can be constructed by folding a small portion 96 of ends 52 of tape 50 over a rod 94 to which loop or eye 58 is secured and then welding folded portion 96 to the original end 52. Since aperture 98 is provided at the fold for eye 58, it is free to swivel.

Referring now to FIG. 8 wherein is shown a novel visual study system and drag measuring mechanism incorporating absorber 10 of the instant invention. Drag member 60 is shown as an inflatable sphere made of gores 62 and end panels 64. Cable 68 of minimum length is attached at one end to absorber 10 and at the other end to sphere 60 at 66. The opposite end of absorber 10 is attached to connector 72 which is secured to cable 70. The other end of cable 70 is attached to hook 74 mounted on beam 80. Cable 70 is preferably a braided nylon line which has been found to operate quite successfully under the conditions for the tests to be made with the instant invention.

The drag measurement system is shown in FIG. 8 to include cantilever beam 80 which is machined from a single piece of material to have built-up end section 82 which is attached to support 84 by bolts 83. Support 84 is rigidly secured, as by welding, at 86 to the vehicle from which sphere 60 is to be dragged. Strain gages 90 are mounted on beam 80 immediately adjacent end section 82 and are connected by terminals 88 and leads 92 to instrumentation 94 for determining the strains in cantilever beam 80 and therefore the drag force caused by sphere 60. The instrumentation to which leads 92 are connected is of conventional design and within the purview of the art.

Operation

Drag member 60 is preferably a folded, inflatable, aluminum Mylar sphere that is packaged to be released by explosive bolts and ejected jack-in-the-box fashion. The drag of the folded sphere will gradually increase as it becomes inflated. The drag causes sphere 60 to float back and probably somewhat downward from the aerospace vehicle from which it is deployed. Energy absorber 10 is secured to sphere 60 at 66 and is deployed therewith as well as cable 70 which is unwound from a reel, such for example as the commercially available spin fishing type. In order to permit accurate measurement of the drag force, cable 70 would be wound about the reel in a fashion to permit cable 70 to be completely free from the reel once it is fully deployed. Since reel is not secured to either the vehicle or cable 70, it is free to fall away from the deployed system without becoming entangled therewith. In the absence of absorber 10, when sphere 60 has floated rearward the full extent of cable 70 there is an impact and attendant rebound of sphere 60 which could overtake the aerospace vehicle and possibly become entangled therewith. Accordingly, energy absorber 10 is positioned near sphere 60 to absorb the energy resulting from the rearward flotation thereof. An ideal absorber 10 would be completely nonelastic and absorb energy over a sufficiently long period of time to prevent excessive buildup of forces within cable 70. In order to accomplish the ideal situation, absorber 10 is provided with a diminishing absorption rate.

The diminishing rate of absorption of absorber 10 is accomplished by designing tape 50 with relatively wide end sections that gradually taper to narrower central portion 54. Tape 50 is folded about centerline 56 to position ends 52 over one another. Should the alternative embodiment of spool 20 be utilized, a small portion of central section 54 is fitted into slot 32 in shaft 30. Tape 50 is then wound about shaft 30 and as the ends 52 are approached, tape 50 is held neatly coiled by inner plates 26 and 28 or convex faces 126 and 128 or end plates 22 and 24 or 122 and 124, respectively.

Figure 2:
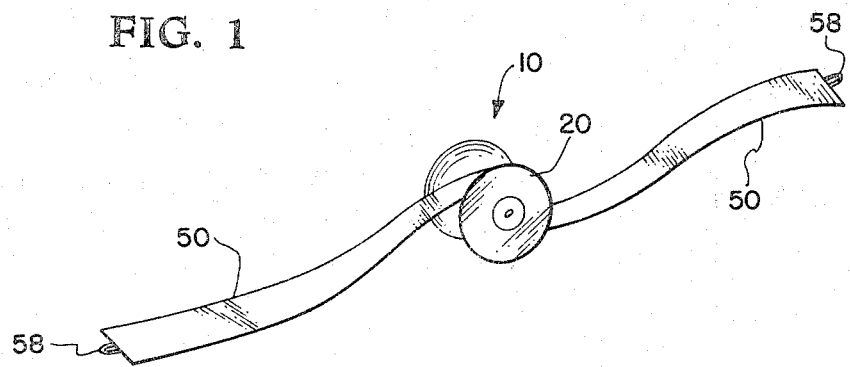
FIG. 2 is an isometric diagrammatic view of the absorber of FIG. 1 after partial operation.

In view of the above-identified operation, it is seen that as the tensile forces between sphere 60 and cable 70 increase, tape 50 is unwound from spool 20. Tape 50 has been found to perform efficiently when made from soft aluminum sheet that tends to yield and retain its rolled shape. The material then has to yield again while being unrolled and most of the velocity or impact energy is expended in this way. However, some energy is expended in angularly accelerating the rolled mass and an additional amount is expended in linear acceleration of the tape. As can be seen from FIGS. 2 and 7, the tape gradually tapers to a smaller width as it unwinds as well as the configuration of the diameter of the rolled up absorber decreasing as tape 50 is unwound. This provides the diminishing absorption rate desired. It is apparent that the amount of energy to be absorbed will dictate the dimensions for tape 50 which may be readily calculated by the skilled artisan. For example, a different material may be used or the length, width or thickness of the tape may be varied. In fact, if the exact impact velocity is known, tape 50 could be designed to absorb energy at a constant rate.

The instant invention contemplates a one-shot type mechanism. That is, absorber 10 will function and operate only once and then must be rewound for a subsequent use. Once sphere 60 has been fully deployed with cable 70 fully extended and the energy absorbed by absorber 10, the visual study and drag measurement system is in operative position. Accordingly, the aerodynamic drag induced upon sphere 60 and the aerospace vehicle is transmitted to cantilever beam 80. Strain gages 92 pick up the strain from beam 80 and transmit them through terminals 88 and leads 90 to the required instrumentation 94. It has been found that painting or coloring sphere 60 provides the best means for the color or visual study. However, the use of aluminum for tape 50 in absorber 10 has a tendency to reflect light rays which cause a glare that hinders an accurate visual study. In order to overcome the glare caused by the aluminum, a coating, such as Alodine-100, is applied to provide tape 50 with a dull finish.

As indicated by the description of the invention hereinabove, it is readily apparent that the instant energy absorber will occupy a very small volume and withstand maximum vibration as well as being capable of operation in a space environment. Further, the instant absorber is not affected by several weeks dormancy prior to actual operation and possesses the feature of a diminishing absorption rate versus time during absorber operation over a wide range of impact energy magnitudes.

Obviously many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. An impact energy absorber for preventing destruction of masses joined by a cable comprising: reel means for absorbing a portion of the energy as the masses are separated; tape means wound upon said reel means for absorbing the remainder of the energy causing separation of the masses; and said tape means being wider at the ends than the center thereof and made of a material tending to yield and retain its rolled shape, whereby there is a decreasing absorption rate for energy during operation of the absorber.

2. An energy absorber comprising: spool means including a shaft extending between end plates; an elongated tape gradually increasing in width from the center toward the ends thereof; said tape being of a material tending to yield and retain a rolled shape and folded at the center thereof; said center portion of said tape positioned adjacent said shaft; and said tape wrapped about said shaft whereby forces at the ends of said tape which tend to unwrap said tape are absorbed by the unwrapping of said tape and rotation of said spool means.

3. An energy absorber comprising: reel means including a shaft extending between end plates having convex inner faces; a slot through said shaft and located substantially centrally between said convex inner faces; an elongated tape gradually increasing in width from the center toward the ends thereof and being of a material tending to yield and retain a rolled shape; said tape folded at the center thereof; said center portion of said tape inserted into said slot; and said tape wrapped about said shaft whereby forces at the ends of said tape which tend to unwrap said tape are absorbed by the unwrapping of the tape and rotation of the reel.

4. An energy absorber comprising: reel means having a pair of end plates joined by a shaft; tape means of gradually greater width from the center to the ends thereof and being of a material tending to yield and retain its rolled shape; the narrower central portion of said tape means positioned adjacent said shaft; and said tape means disposed about said shaft between said end plates whereby forces tending to pull the ends of the tape means away from one another are absorbed at a decreasing rate.

5. The energy absorber of claim 4 wherein said tape means is of one-piece soft aluminum.

6. The energy absorber of claim 4 wherein said tape means is of substantially greater dimension in length than in width.

7. The energy absorber of claim 6 wherein a centrally located radial slot extends through said shaft; and the narrower central portion of said tape means positioned in said slot.

8. The energy absorber of claim 6 wherein said tape means is of one-piece aluminum; and inner plates are in juxtaposition to the interior face of said end plates.

9. The energy absorber of claim 6 wherein said tape means is of one-piece aluminum; and said end plates having convexly curved surfaces on the shaft side thereof.

10. The energy absorber of claim 9 wherein said tape means includes attachment means on the ends thereof.

11. An energy absorption device comprising: a shaft having an elongated radial slot through the center thereof and threaded ends; a pair of substantially hemispherical end plates each having a substantially flat face and a convex face; a bore extending through the center of each of said end plates for receiving said shaft therethrough; counterbores in said flat faces about said bores for nuts threaded upon the ends of said shaft to form a reel; an elongated energy absorber tape having a narrow central portion and gradually widening toward the ends thereof; said tape being of a material tending to yield and retain a rolled shape; loop elements secured to the ends of said tape for attaching cords thereto; said tape folded at the center thereof; the center of said tape inserted in said shaft slot; and said tape rolled around said shaft between said convexly shaped faces of said end plates whereby tensile forces applied to the ends of said tape are absorbed at a decreasing rate as said tape is unrolled from said shaft.

12. The energy absorption device of claim 11 wherein said tape is made from thin, flexible aluminum material.

13. An energy absorption device comprising: a shaft having threads on the ends thereof; a pair of disk-shaped inner plates; a pair of disk-shaped end plates of greater diameter than said inner plates; each of said plates having a central bore extending therethrough for receiving said shaft; counterbores in the outer surface of said end plates about said bores for nuts threaded upon the ends of said shaft to form a reel; an elongated energy absorber tape having a narrow central portion and gradually widening toward the ends thereof and being of a material tending to yield and retain its rolled shape; loop elements secured to the ends of said tape for attaching cords thereto; said tape folded at the center thereof; and said tape rolled around said shaft between said inner plates with the narrow central portion adjacent to said shaft whereby tensile forces applied to the ends of said tape are absorbed at a decreasing rate as said tape is unrolled from said shaft.

14. The energy absorption device of claim 13 wherein the threaded ends of said shaft are of less diameter than the central portion thereof to form abutments for preventing said plates from moving inwardly toward the center of said shaft.

15. The energy absorption device of claim 14 wherein said tape comprises thin, flexible aluminum material.

16. In the method of forming an energy absorber the steps of: folding at its center a tape having a narrow central portion gradually widening toward the ends thereof and being of a material tending to yield and retain its rolled shape; wrapping said tape around the shaft of a spool starting with the narrow central portion; and connecting two elements to be separated by attaching the ends of said tape thereto, whereby the energy of forces tending to separate the two elements are absorbed without destruction of the connection.

References Cited

UNITED STATES PATENTS

| 290,840 | 12/1883 | Blakeslee | 73—184 X |
| 2,483,655 | 10/1949 | Schultz. | |
| 2,709,054 | 5/1955 | Roth | 73—143 X |
| 2,768,068 | 10/1956 | Juve et al. | 73—15.6 X |
| 2,785,775 | 3/1957 | Stevinson. | |
| 3,098,630 | 7/1963 | Connors | 244—113 |
| 3,126,072 | 3/1964 | Johansson | 188—1 |
| 3,217,838 | 11/1965 | Peterson et al. | 188—1 |

JAMES J. GILL, *Acting Primary Examiner.*

RICHARD C. QUEISSER, *Examiner.*

C. A. RUEHL, *Assistant Examiner.*